Patented Aug. 3, 1926.                                             1,594,719

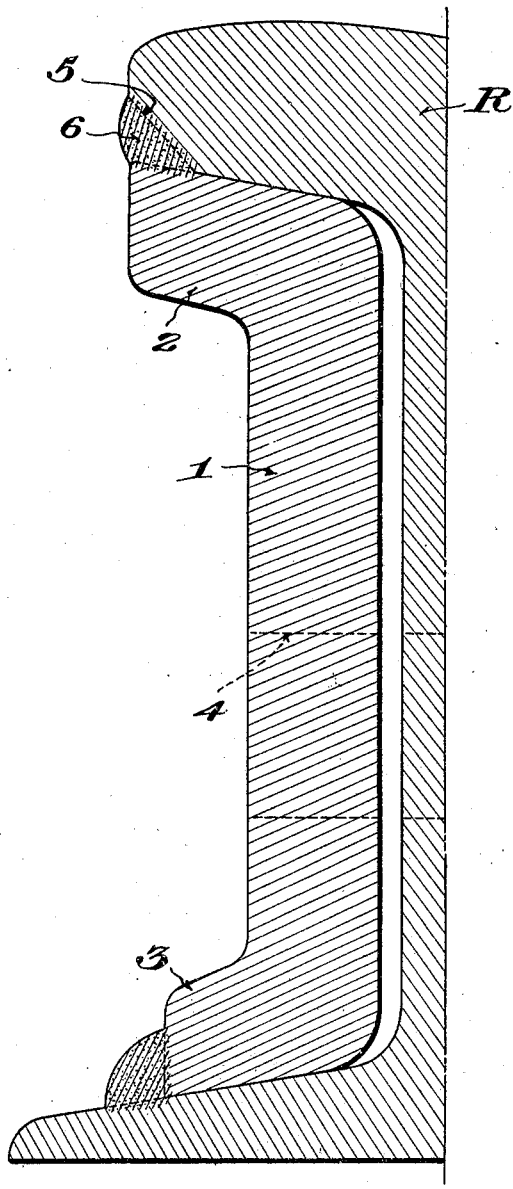

UNITED STATES PATENT OFFICE.

CHESTER F. GAILOR, OF BROOKLYN, NEW YORK, ASSIGNOR TO THE RAIL JOINT COMPANY, OF NEW YORK, N. Y., A CORPORATION OF NEW YORK.

WELDED RAIL JOINT.

Application filed March 10, 1925. Serial No. 14,539.

This invention relates to the subject of welded rail joints, particularly to the special formation shown in my former Patent No. 1,513,498, October 28, 1924, wherein the head of the rail is deformed to facilitate the making of the weld.

To that end the present invention is addressed to that species of the invention of the patent aforesaid in which the rail itself is beveled or deformed to provide the welding space or groove for receiving the welding metal and to facilitate the application of the appliances for making the weld. Furthermore it is proposed by the construction claimed herein to permit the use of easily rolled joint bar shapes for the purpose of making a welded rail joint in which the welding apparatus may be readily positioned and the welds located in a readily accessible position while at the same time making an exceptionally strong weld between the head of the bar and the head of the rail.

The invention is necessarily applicable to various forms of rail structures and to various forms of rail joint shapes but the preferred embodiment is that shown in the accompanying drawings in which—

The figure of the drawing is a half sectional view of a rail joint embodying the particular form and character of head weld contemplated by the present invention.

In explanation of the improvement attention is drawn to the figure of the drawing wherein the letter R designates the rail, and the reference letter 1 designates the joint bar. It is preferable in carrying out the invention to employ the joint bar shown in my former patent which is usually a rolled shape of channel cross section to provide the top and bottom welding flanges 2 and 3 respectively and the upright web portion 4 which is so arranged with reference to the flanges as to fit closely to the web of the rail. This assures a maximum girder stiffness and strength for the bar and also locates the same in the direct line of stresses caused by heavy car traffic. Furthermore the flanges 2 and 3 are inclined and partake of the angle of the fishing surfaces so as to have a wedging fit in the fishing spaces of the rail so the bar is placed under compression at its head and at its foot, thereby insuring effective welds and relieving the latter of strain incident to loose fitting plates.

The particular improvement of the present invention is that of providing the rail head at its under side with a deformation 5 which may consist of a beveled or cut away surface between which and the flat undeformed upper side of the top flange 2 of the joint bar is formed a groove or welding space that receives the welding metal for making the top weld. The flat undeformed upper side of the top flange 2 of the bar provides a supporting ledge for the welding material that greatly facilitates supporting the material during the making of the weld and at the same time presents a substantial body of metal at the top corner of the bar that contributes to the strength of the head. It will be seen in this connection that the construction described provides a most accessible welding space, greatly facilitating the making of the weld, while at the same time locating the weld in such a manner as practically to fill out the rail head contour by the weld itself. This is of practical importance in the production of an effective, nonprotuberant weld. The described construction is that shown in Figure 6 of my patent aforesaid, and the bottom weld 7 preferably formed by making such weld between the outer end of the bottom flange 8 and the top surface of the rail base flange.

The invention necessarily is susceptible of modification within the scope of the appended claims without departing from the spirit or sacrificing any of the advantages of the invention.

I claim:—

1. A welded rail joint including the rail head having a deformation and the joint bar having an undeformed surface lying opposite said rail head deformation thereby forming a supporting ledge and a welding space or groove at the head of the rail.

2. A welded rail joint including the rail having the bottom corner of its head deformed or cut away producing a recess at that point, and the joint bar having an undeformed inclined flat head portion lying opposite the rail head deformation and forming one wall of the recess.

In testimony whereof I hereunto affix my signature.

CHESTER F. GAILOR.